United States Patent [19]

Stewart et al.

[11] 4,445,017
[45] Apr. 24, 1984

[54] ELECTRICAL SWITCHGEAR

[75] Inventors: John S. Stewart, Nottingham; George A. Hodkin, Leicester, both of England

[73] Assignee: Brush Switchgear Limited, Loughborough, England

[21] Appl. No.: 311,922

[22] Filed: Oct. 16, 1981

[30] Foreign Application Priority Data

Jan. 24, 1981 [GB] United Kingdom ............... 8102210

[51] Int. Cl.³ ............................................ H01H 33/18
[52] U.S. Cl. ............................. 200/144 A; 200/147 R
[58] Field of Search .......... 200/144 A, 147 R, 147 A, 200/147 B, 50 A, 50 AA, 148 R

[56] References Cited

U.S. PATENT DOCUMENTS 3,179,762  4/1965  Swinney ........................ 200/50 A
4,031,341 12/1981  Parry ............................ 200/147 R Primary Examiner—E. A. Goldberg
Assistant Examiner—Morris Ginsburg
Attorney, Agent, or Firm—Darby & Darby

[57] ABSTRACT

Electrical switchgear comprises a first contact set composed of a first contact which is pivotable about a pivot axis and a second contact, the contacts being relatively movable between a closed position wherein a load current can be passed therethrough and an open position. An arc is formed between the first contact and an arcing electrode during movement of the contacts from their closed to their open position, whereupon current flows through a field coil connected in series with the electrode to produce a magnetic field which causes the arc to rotate and become extinguished. The pivot axis of the first contact extends transversely to a major axis of the field coil such that, during opening of the contacts, an end portion of the first contact moves transversely to and inwardly of said major axis. A second contact set is operable to earth the first contact set when its contacts are in their open position. Both the first and second contact sets are disposed in a common housing which contains an electrically insulating fluid.

10 Claims, 5 Drawing Figures

ELECTRICAL SWITCHGEAR

This invention relates to electrical switchgear particularly, though not exclusively, for use with ring main equipment, and is an improvement of the switchgear disclosed in U.S. Pat. No. 4,301,341.

The switchgear of the above-mentioned patent comprises generally a main contact set composed of first and second contacts which are relatively movable between open and closed positions and through which a load current passes in use. During opening of the contacts an arc is formed between the first contact and an arcing electrode, and a field coil is connected in series with the arcing electrode so that the arcing current flowing therethrough produces a magnetic field which causes the arc to rotate and become extinguished. The first contact is pivotable about an axis transverse to the axis of the field coil and has an end portion which, when the contacts are opened, moves transversely to and inwardly of the field coil axis. The whole assembly is enclosed in a housing containing an electrically insulating fluid, such as sulphur hexafluoride. Such a construction has, amongst others, the advantages that it can be made compact and that arc rotation can be achieved reliably for a wide range of breaking currents.

With such a construction, it has been the practice to provide an earthing contact set outside the housing in order to preserve the compactness of the unit. The earthing contact set is thus exposed to atmospheric effects, with the result that the basic impulse level will decrease with an increase in the altitude at which the switchgear is installed, and there is a tendency for corona discharge to occur in humid conditions.

It is an object of the present invention to obviate or mitigate the above-mentioned problems. To this end, according to the present invention the earthing contact set is enclosed in the same housing as the main contact set. In this way, maximum use is made of the insulating fluid in the housing, and there are no live metallic contacts in air so that the atmospheric effects described above are avoided.

The earthing contact set can include a first contact member which is movable into engagement with a second contact member carried by the first contact of the main contact set.

Where the switchgear is used in conjunction with ring main equipment, the main contact set controls the flow of current to a T-off connection. Preferably, a further pair of contact sets which control the flow of current through ring main cables are also enclosed in said housing. Each of the further pair of contact sets advantageously includes a movable contact which is engageable with a first fixed contact to close the contact set and which is also engageable with a second fixed contact to earth the contact set.

Each contact set conveniently includes an operating shaft journalled on the housing, a further shaft journalled on the internal components of the switchgear, and a link operatively interconnecting the shafts, the link being secured in position after the internal components have been inserted in the housing. This enables the internal components, especially the contact sets themselves, to be pre-assembled before insertion in the housing, thereby giving greater room for the assembly of said components.

The present invention will now be further described, by way of example, with reference to the accompanying drawings, in which.

Figure 1:
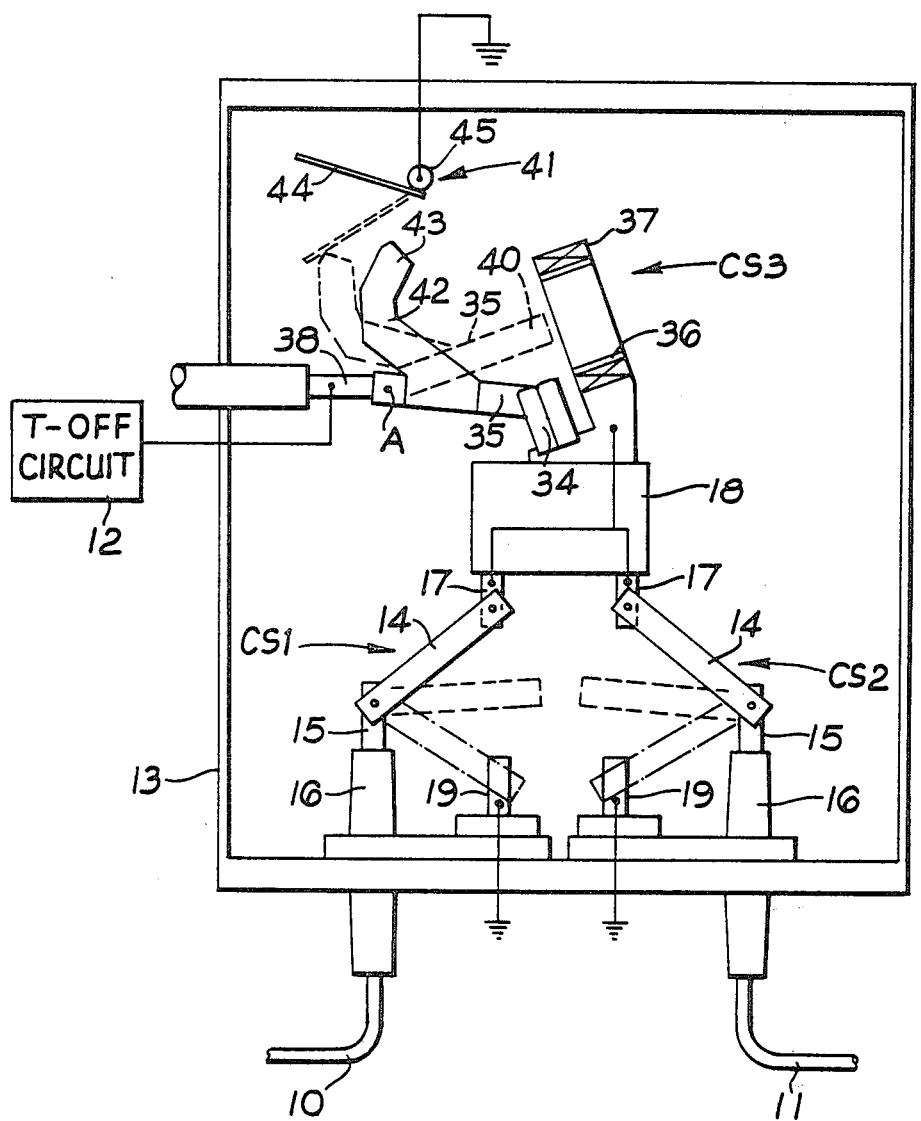
FIG. 1 is a schematic view of part of a ring main unit employing electrical switchgear according to the present invention.
Figure 2:
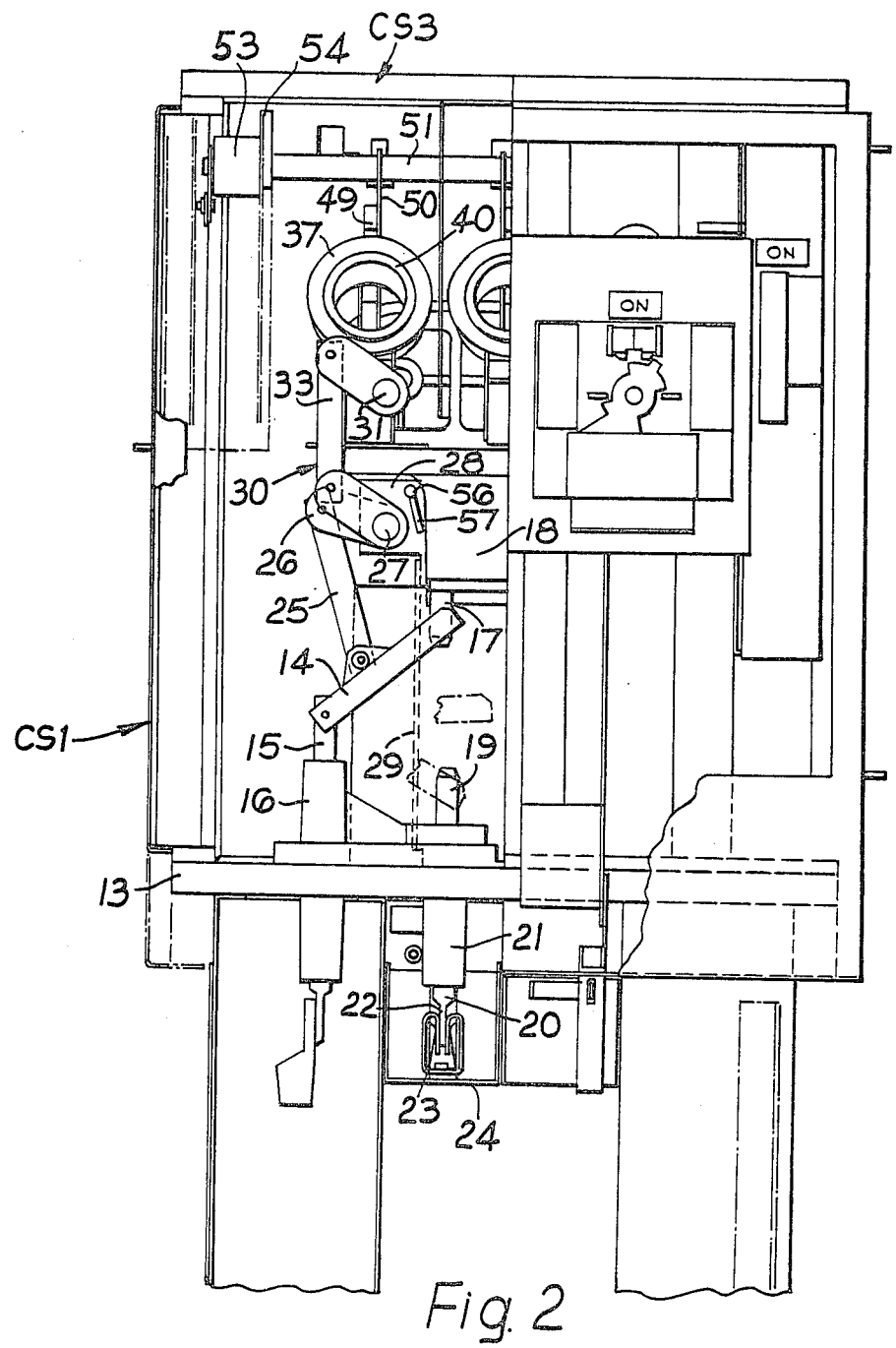
FIG. 2 is a side view, partly in section, of the ring main unit.
Figure 3:
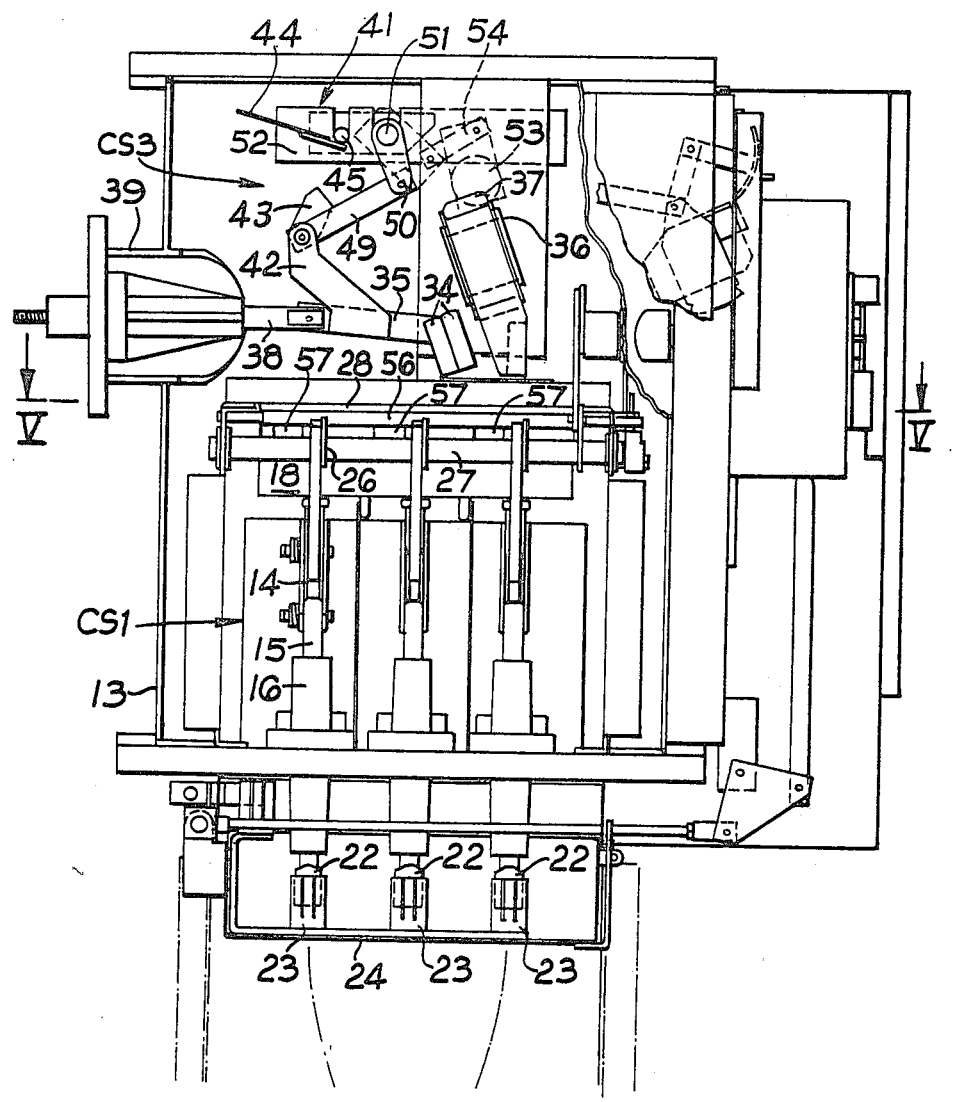
FIG. 3 is a sectional front view of the ring main unit shown in FIG. 2.
Figure 4:
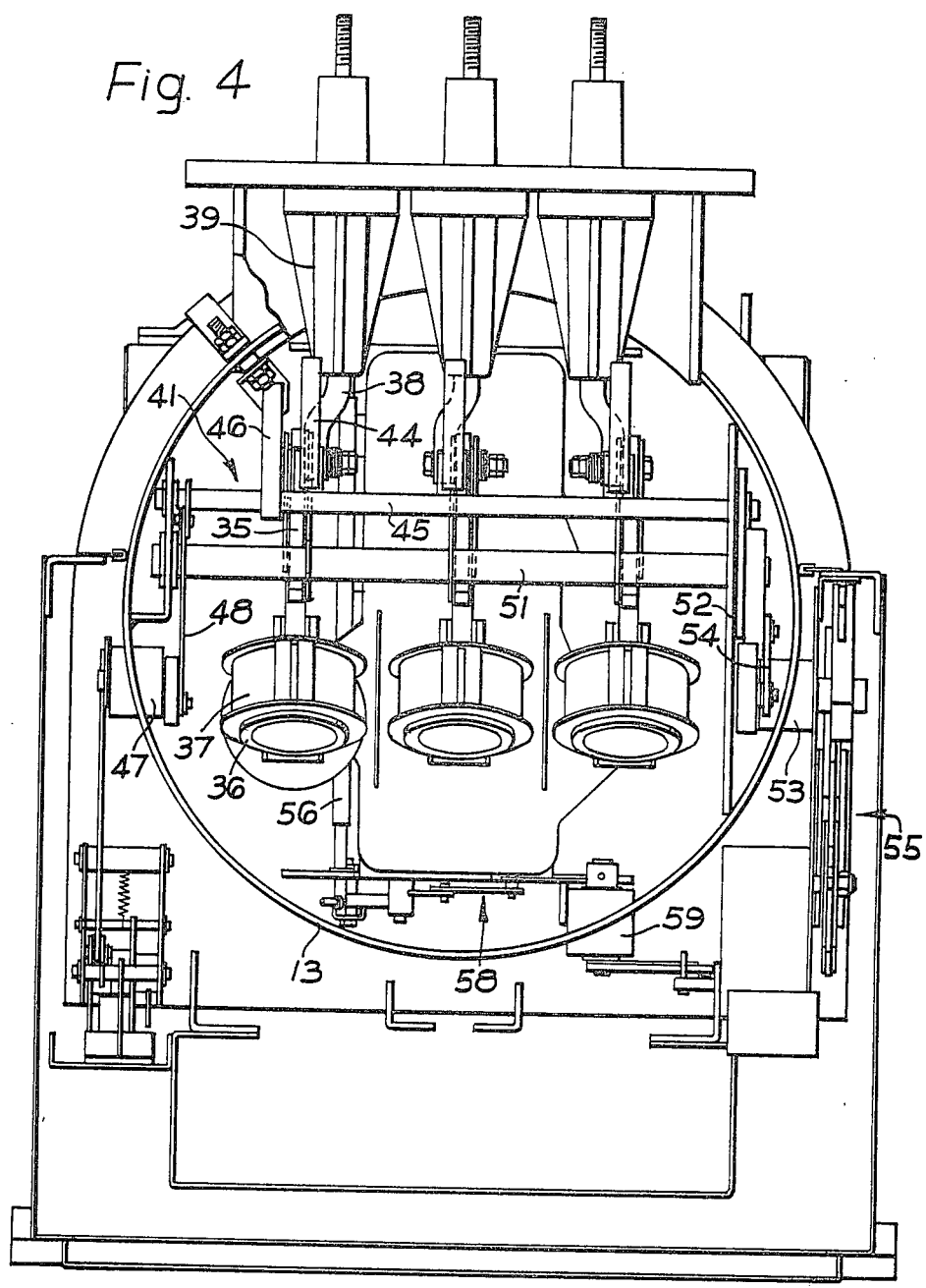
FIG. 4 is a sectional plan view of the ring main unit.
Figure 5:
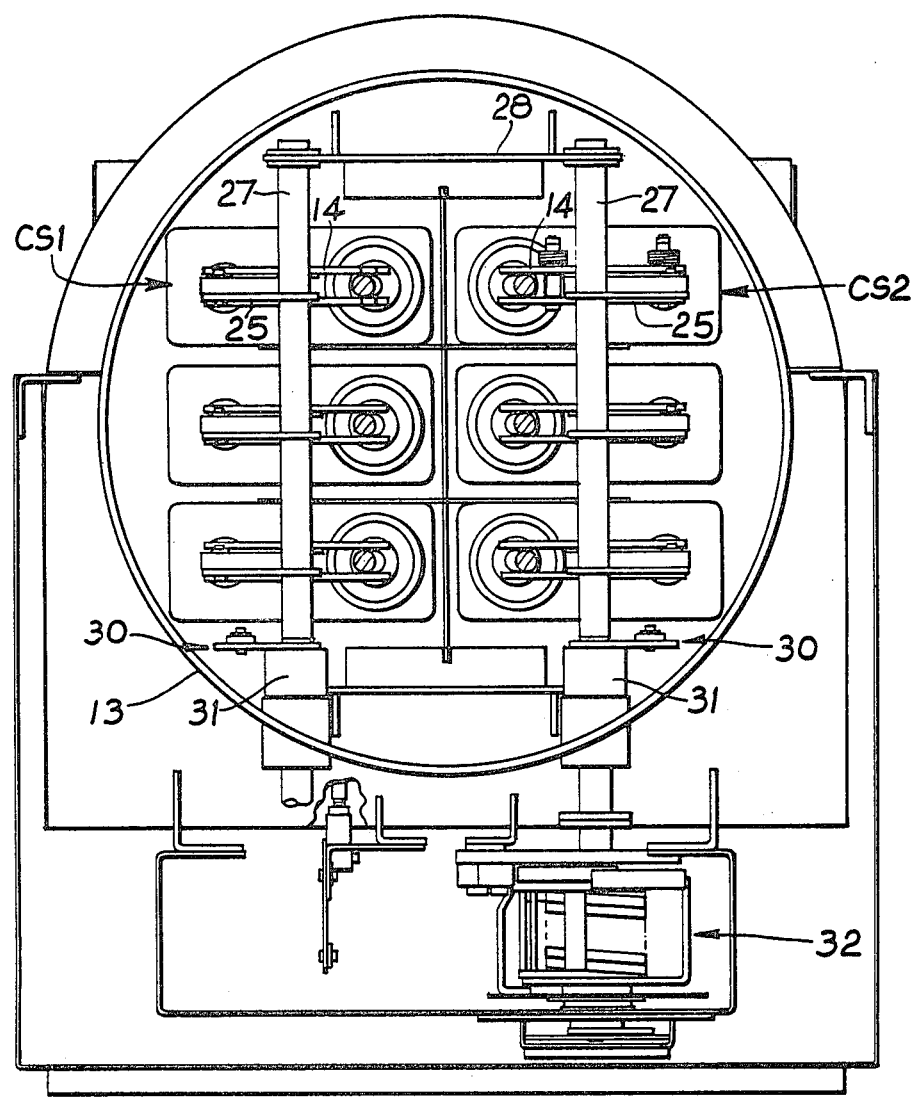
FIG. 5 is a section taken along the line V—V in FIG. 3.

The ring main unit shown in the drawings in intended for three-phase operation and comprises, for each phase, first and second contact sets CS1 and CS2 which control the flow of current through respective ring main cables 10 and 11, and a third contact set CS3 which controls the current flow to a T-off circuit 12. The arrangement for one of the phases is indicated schematically in FIG. 1. The contact sets CS1, CS2 and CS3 for all three phases are enclosed by a cylindrical switch housing 13 which contains the highly insulating gas sulphur hexafluoride.

Each of the contact sets CS1 and CS2 includes a pivotable contact 14 electrically connected to a conductor 15 which passes through an insulating bushing 16 mounted on a bottom end wall of the switch housing 13, the conductor 15 being in turn electrically connected to the respective ring main cable 10 or 11. The contact 14 is pivotable between a closed position (indicated by solid lines in FIG. 1) in which it engages a fixed contact 17 mounted on an insulating resin monoblock structure 18, an open position (indicated by chain dotted lines) in which it engages a fixed earthed contact 19. In addition to earthing the contacts in this latter position, the contacts 19 can be used for the purpose of testing the ring main cables 10 and 11. To this end, each contact 19 is formed by one end of a conductor 20 which passes through an insulating bushing 21 in the bottom end wall of the switch housing 13, the other end of each conductor 20 having a connector 22 thereon. Normally, the connectors 22 are earthed to the switch housing by respective terminals 23 carried on a cover 24, but for testing purposes the cover 24 and terminals 23 are removed allowing the connectors 22 to be connected instead to the test equipment.

In an alternative construction (not shown) the bushings 16 and 21, instead of being mounted on the bottom end wall of the housing 13, form an integral part of a base plate cast from electrically insulating material which closed the bottom end of the housing.

In each of the contact sets CS1 and CS2, the contact 14 is pivoted by means of a mechanism which includes an insulating link 25 pivotably connected at one of its ends to the contact 14 and at the other end thereof to an arm 26 which is rotatable with a lay shaft 27. The lay shaft 27 is common to the contact sets of all three phases, and is journalled at its ends in respective brackets 28 secured to a support 29 for the monoblock structure 18. A four-bar linkage 30 connects the lay shaft 27 to an operating shaft 31 which is journalled in the side wall of the switch housing 13 and which is rotated in use by an operating mechanism 32 disposed on the exterior of the switch housing. More particularly, the four-bar linkage 30 includes a pair of arms carried respectively by the shafts 27 and 31, and a link 33 which pivotally interconnects these arms. This particular arrangement enables the lay shaft 27 and its associated parts to be assembled with the internal components of the switchgear before insertion into the switch housing, and to be connected to the operating shaft 31 after such insertion by securing the link 33 in place. This, of course, applies not only to the shafts 27 and 31 associated with the contact sets CS1 of all three phases, but also to the corresponding shafts associated with the contact sets CS2.

The contact set CS3 of each phase comprises generally a fixed contact 34, a movable contact 35, a tubular arcing electrode 36 and a field coil 37. The fixed contact 34 is composed of a plurality of contact fingers and, together with the arcing electrode and the field coil, is mounted on the monoblock structure 18. The field coil 37 surrounds the arcing electrode 36 so as to be co-axial therewith, and is electrically connected in series with the electrode 36. The movable contact 35 is in the form of a contact arm which is pivotable about an axis A perpendicular to the axis of the field coil 37, and is electrically connected to a conductor 38 which passes through an insulating bushing 39 in the side wall of the switch housing 13, the conductor 38 being in turn connected to the T-off circuit 12. In the illustrated construction the contact arm 35 is pivotally mounted on an end of the conductor 38 and is electrically connected thereto by means of the pivot. In an alternative preferred arrangement, however, the contact arm 35 is instead pivotally mounted on a bracket secured to the monoblock structure 18 and is electrically connected to the conductor 38 by means of a flexible conductive strap.

The contact arm 35 can be pivoted between a closed position (indicated by solid lines in FIG. 1) in which an end portion 40 thereof engages the contact fingers 34 and an open position (indicated by broken lines) in which the end portion 40 is spaced from the contact fingers 34 and lies along the field coil axis. During movement of the contact arm 35 from its closed position to its open position, the end portion 40 moves radially inwardly across a pole face of the field coil. An arc which is initially drawn between the contacts 34 and 35 transfers its root to the arcing electrode 36, thereby bringing the field coil 37 into circuit. The arcing current which then flows through the coil 37 produces a magnetic field which causes the arc to rotate and become extinguished.

In order to earth the contact arm 35 in its open position, an earthing contact assembly 41 is provided. More particularly, the contact arm 35 has a bracket 42 secured thereto, one end of which carries a contact block 43. The bracket 42 thus moves with contact arm 35 when the latter is pivoted and occupies the position indicated in broken lines in FIG. 1 when contact arm 35 is in its open position. The contact block 43 is engageable by a contact strip 44 carried for rotation with an operating shaft 45 which is common to all three phases, the shaft being earthed to the switch housing by means of contact blade 46 which makes sliding contact with the shaft 45. In an alternative arrangement (not shown), the contact block 43 is replaced by an M-shaped clip, and the contact strip 44 is replaced by a contact rod which engages within an upwardly-facing V-shaped recess in the clip to earth the contact arm 35. Rotation of the operating shaft 45 is effected by means of an operating mechanism disposed externally of the switch housing 13 through the intermediary of a shaft 47 journalled in the switch housing side wall and a link 48. The shaft 45 and its associated parts can thus be assembled with the internal components of the switchgear prior to insertion into the switch housing, and can be connected to the shaft 47 after such insertion merely by securing the link 48 in place.

An operating mechanism for pivoting the contact arm 35 includes an insulating link 49 pivotally connected at one end thereof to the bracket 42 and at the other end thereof to an arm 50 which is rotatable with a lay shaft 51 common to all three phases. The lay shaft 51, together with the shaft 45, is supported by carrier plates 52 mounted above the arcing electrodes 36 and field coils 37. The lay shaft 51 is in turn connected to an operating shaft 53 journalled in the switch housing side wall by means of a link 54 which, like the link 48, can be secured in place after the shaft 49 and its associated parts have been inserted into the switch housing. The operating shaft 53 is rotated in use by means of an operating mechanism 55 disposed externally of the switch housing.

Although not illustrated in the drawings, the electrical switchgear is provided with a series trip which senses the current flowing through the switchgear and which opens the contact set CS3 by means of a trip mechanism when the current exceeds a predetermined limit. The series trip can be of a type which operates on thermal and magnetic principles, and can be incorporated into the resin monoblock structure 18. Preferably, however, the series trip is in the form disclosed in our copending UK patent application No. 8231962 entitled "Current Sensing Device", and is mounted on the exterior of the switch housing 13 to enable ready access to be gained thereto, for example, for the purpose of changing the components of the device to suit the particular current/time characteristics required for the tripping mechanism.

In the illustrated construction, the tripping mechanism is provided inside the switch housing 13 and includes an operating shaft 56 which is disposed parallel and adjacent to the resin monoblock structure 18. The shaft 56 is caused to rotate when contact pads 57 thereon are hit by plunger rods, not illustrated, which are actuated by the series trip. Such rotation of the shaft 56 causes a link 58 to rotate a shaft 59, which is journalled in the side wall of switch housing 13. Movement of the shaft 59 outside the switch housing 13 is used to effect operation of the mechanism 54 which causes the contact set CS3 to open. The complete linkage is reset by applying reverse rotation to the shaft 59. The provision of the link 58 enables the shaft 56 and its associated parts to be assembled with the internal components of the switchgear before insertion into the switch container, and to be connected to the shaft 59 after such insertion merely by securing the link 58 in place.

In the construction described above, not only the load current-carrying contact sets but also all of the earthing contact sets are enclosed in the highly insulating environment provided by the switch housing, so that there are no live metallic conductors in free air. Accordingly, the basic impulse level of the switchgear will not be affected by the altitude at which it is installed, and there will be little danger of corona discharge in humid conditions.

In a modified arrangement, the contact sets for the T-off connection are provided in a separate unit from the contact sets CS1 and CS2 for the ring main cables. In this case, the load current-carrying contact sets CS3 and the earthing contact sets 41 are still enclosed in a common housing containing a highly insulating fluid, preferably sulphur hexafluoride.

We claim:

1. Electrical switchgear comprising:
   (a) a first contact set composed of a first contact pivotable about a pivot axis and a second contact, said first and second contacts being relatively movable between a closed position wherein a load current can be passed therethrough and an open position;
   (b) an arcing electrode, and arc being formed between said arcing electrode and said first contact during movement of said first and second contacts from said closed position to said open position;
   (c) a field coil connected in series with said arcing electrode and operative in response to a current caused by the arc flowing therethrough to produce a magnetic field which causes the arc to rotate and become extinguished, said field coil having a major axis with respect to which said pivot axis is disposed transversely, whereby an end portion of said first contact moves transversely to and inwardly of said major axis when said first and second contacts are moved to said open position;
   (d) a second contact set operable to earth said first contact set when said first and second contacts are in said open position, said second contact set including first and second contact members, said second contact member being carried by said first contact of said first contact set, and said first contact member being movable into engagement with said second contact member; and
   (e) a housing in which said first and second contacts sets are commonly disposed, said housing containing an electrically insulating fluid.

2. Electrical switchgear according to claim 1, wherein said first contact member is carried by a rotatable shaft which is mounted above said arcing electrode and said field coil, and a contact blade slidably engages said rotatable shaft earths said shaft to said housing.

3. Electrical switchgear according to claim 1, wherein said second contact member is in the form of an M-shaped clip which defines therein a recess, and said first contact member is in the form of a rod which is engageable in the recess.

4. Electrical switchgear according to claim 1, wherein each of said first and second contact sets includes an operating shaft rotatably journalled on said housing, a further shaft rotatably journalled on components of said switchgear disposed internally of said housing, and a link operatively interconnecting said operating shaft and said further shaft, said link being securable in position after said components disposed internally of said housing have been inserted in said housing.

5. Electrical switchgear according to claim 1, including one said first contact set and one said second contact set for each phase of a three-phase electricity supply, all of said first and second contact sets being disposed in said housing.

6. An electrical distribution system comprising: electrical switch gear including;
   a first contact set composed of a first contact pivotable about a pivot axis and a second contact, said first and second contacts being relatively movable between a closed position wherein a load current can be passed therethrough and an open position;
   an arcing electrode, an arc being formed between said arcing electrode and said first contact during relative movement of said first and second contacts from said closed position to said open position;
   a field coil connected in series with said arcing electrode and operative in response to a current caused by the arc flowing therethrough to produce a magnetic field which causes the arc to rotate and become extinguished, said field coil having a major axis with respect to which said pivot axis is disposed transversely, whereby an end portion of said first contact moves transversely to and inwardly of said major axis when said first and second contacts are moved to said open position;
   a second contact set operable to earth said first contact set when said first and second contacts are in said open position, said second contact set including first and second contact members, said second contact member being carried by said first contact of said first contact set, and said first contact member being movable into engagement with said second contact member;
   a housing in which said first and second contacts sets are commonly disposed, said housing containing an electrically insulating fluid; and
   wherein said switch gear is connected to ring main equipment comprising ring main cables and a T-off connection, wherein said first contact set controls the flow of current to said T-off connection, and a further pair of contact sets are provided which control the flow of current to said ring main cables, said further pair of contact sets also being disposed in said housing.

7. Electrical distribution system according to claim 6, wherein each of said further pair of contact sets includes a movable contact and first and second fixed contacts, said movable contact being engageable with said first fixed contact to close each further contact set and being engageable with said second fixed contact to earth each further contact set.

8. Electrical distribution system according to claim 7, wherein said second fixed contacts of said further pair of contact sets have parts which are disposed externally of said housing and which are provided with respective connectors thereon, and a cover is mounted on said housing and carries terminals which engage said connectors respectively to earth said second fixed contacts to said housing, said cover being detachable from said housing to disengage said terminals from said connectors.

9. Electrical distribution system according to claim 7, further comprising an electrically insulating monoblock structure which supports said first fixed contacts of said further pair of contact sets, said second contact of said first contact set, said arcing electrode and said field coil.

10. Electrical distribution system according to claim 9, wherein said first contact of said first contact set is pivotally supported by said electrically insulating monoblock structure.

* * * * *